UNITED STATES PATENT OFFICE.

OLIVIER BOCANDÉ, OF PARIS, FRANCE.

PROCESS FOR THE PRESERVATION OF MEAT AND OTHER FOODSTUFFS.

1,148,823.

Specification of Letters Patent.

Patented Aug. 3, 1915.

No Drawing.   Application filed September 16, 1913.   Serial No. 790,112.

*To all whom it may concern:*

Be it known that I, OLIVIER BOCANDÉ, citizen of the Republic of France, residing at 6 Rue du Colonel-Moll, Paris, France, have invented certain new and useful Improvements in the Process for the Preservation of Meat and other Foodstuffs, of which the following is a specification.

The preservation of food stuffs in atmospheric air can be effected only by placing them in a condition of resistance against the attack of the various agencies acting to deteriorate or destroy the said food stuffs. It is not merely sufficient to render food stuffs imputrescible; it is equally necessary to preserve them in an eatable condition for a sufficiently long period, and for this purpose it is necessary to prevent them being deteriorated by the air and external agencies and especially by the desiccation produced by the evaporation of water in the free air.

The present invention has now for its object to provide an improved process for the preservation of food stuffs of all kinds, such as meat, fish, eggs, butter, cheese, vegetables, fruit, etc.

This improved process consists in covering the said food stuffs with a skin having the following necessary properties: 1. It is imputrescible. 2. It adheres to all the varying contours of the food stuffs, covering the same in an absolutely air-tight manner without leaving the slightest space between itself and the food stuff to be preserved. 3. It is impervious to air, so that it prevents the oxidation of the food stuffs. 4. It is not hygrometric, so that it protects the food stuff from the access of external moisture. 5. It prevents the transudation of the food stuff either directly or due to osmosis, so that the food stuff can be kept without desiccation and without loss of weight. 6. It does not impart to the preserved food stuff any bad flavor, or bad odor, and it has no chemical or physiological action whatever thereupon. In a word it preserves all the nutritious qualities of the food stuffs without the slightest alteration.

In carrying out this invention, the said skin is constituted by a layer of gelatinous or colloidal substance which has been rendered insoluble and which is deposited upon the food stuff to be preserved only after there has been interposed between the said skin and the living or active portions of the food stuff a material which is impermeable to water so that it will prevent liquid, sap, juice or blood from escaping owing to osmosis through the said skin. The characteristic feature of the improved process consists essentially in this double hermetic, impervious, insoluble and adhering cover, with which the living or active portions of the food stuffs to be preserved are coated, and which while allowing nothing to enter and nothing to pass out even by osmosis, constitutes at one and the same time a means of preserving and a means for protecting, self sufficient against external influences.

The improved process will now be described in its application for preserving meat, but it is to be understood that it may be applied in an analogous manner for preserving all other food stuffs.

*First operation—Preparation of the meat.*—The animals are divided into a greater or smaller number of joints or pieces from which the organs, glands or vessels are removed which by their nature are more readily liable to decompose and which would necessitate for preserving purposes, if left in the meat, a much more thorough desiccation than suffices for meat without such organs, etc.

*Second operation—A superficial antisepsis having for its object to destroy any microbes with which the meat may have become soiled by contact with the hand or by dust.*—The meat is treated with ozone in a vacuum. For this purpose the prepared meat is placed in a chamber wherein the highest possible vacuum is produced by means of an air pump. After having produced this vacuum a mixture of oxygen and ozone is passed into the apparatus which increases the internal pressure to atmospheric pressure. Owing to the preceding vacuum, the air and gases contained in the meat are expelled and the meat owing to the opening of its pores due to the vacuum is rendered adapted to receive the oxygen and the ozone which enter therein under the external pressure. This superficial penetration of the meat by the oxygen and ozone has the effect of destroying the surface microbes and all the noxious germs which may have succeeded in penetrating as far as the openings of the vessels. This treatment by ozone, compared with all hitherto known treatments wherein antiseptics are employed, has the advantage of introducing no element whatever which is injurious in a food, since ozone acts solely as an oxidizing agent without leaving any chemical traces of its passage, and also the ozone disappears almost instantaneously owing to its instability.

*Third operation—Concentration of the blood.*—After the preceding antiseptic treatment has been completed, the vacuum is reëstablished and the internal temperature is maintained at from 15 to 30 degrees centigrade by any suitable means which will insure the regular progress of the evaporation. By this rapid evaporation, the vapors given off by the meat will become partly condensed in a tubular condenser, that is cooled below 0 degrees C. The absorption of these vapors may be accelerated by the presence of hygroscopic substances (for instance sulfuric acid). After some hours the meat will have lost by evaporation about 15 to 20 per cent. of the weight of the water contained in the meat. The concentration of the blood is sufficient to render the meat imputrescible and to prevent the microbes from traveling about. The operation is then arrested by charging the apparatus with pure air ozonized if required, or with an inert gas such as nitrogen.

*Fourth operation—Covering.*—The meat is then covered with a skin prepared according to this invention in the following manner:—A bath is prepared having the following composition:—water 65 to 60 per cent., gelatin 20 to 25 per cent., sea salt about 5 per cent., sugar about 5 per cent., glycerin about 5 per cent., pure formaldehyde about 2 per thousand.

After the joints of meat have been removed from the vacuum apparatus they are first covered with a waterproof material, for instance tin foil, sheets of gutta-percha, fabric or greased paper, etc., and then dipped into the gelatin bath prepared as above, which bath is maintained at temperatures of about 25 to 35 degrees C. This waterproof material must be applied in such a manner that it will adhere to the meat without leaving any space between it and the meat, and with this object it may, if necessary, be applied after having been dipped into a bath of the same composition but slightly more fluid. The gelatin covering should constitute an integral envelop over all the parts of the meat and thus form a tight and adhering covering. This skin is then dried by hanging the joints of meat for several hours in passages under forced ventilation. The meat is then ready to be sent away in an ordinary simple packing, the said skin being sufficiently supple and tenacious to protect the meat. The joints of meat may be preserved in free air during several months in ordinary stores.

When it is desired to consume the meat, it is sufficient to remove the skin which can be very readily done by slitting it with a knife and detaching it from the skin in the same way as skinning a rabbit. This meat thus treated has the same appearance, the same odor and the same flavor as meat fresh from the slaughter house.

The above described covering may be applied equally well to meat which has been rendered aseptic by the means hereinbefore described, as also to meat which has been rendered aseptic by any other means such as for instance, salt meat, smoked meat, cooked meat. The covering may also be employed for preserving raw or cooked hams, sausages, etc.

The improved process is also applicable to other food stuffs in the same manner as to meat, except that certain parts of the preliminary preparation may be omitted in the case of clean food stuffs, such as fruits and vegetables.

Having now described my invention what I claim as new and desire to secure by Letters Patent is:—

1. A process for preserving meat and other food stuffs which consists in covering the said food stuffs previously rendered aseptic, first with a thin layer of waterproof material closely applied and adhering to the surface of the food to contact with all the parts thereof, then with an airtight envelop composed of an insoluble gelatinous colloidal material applied directly to said waterproof material.

2. A process for preserving meat and other food stuffs which consists in covering the said food stuffs previously rendered aseptic, first with a thin layer of waterproof material closely applied and adhering to the surface of the food to contact with all the parts thereof, then with an airtight envelop composed of an insoluble gelatinous colloidal material applied directly to said waterproof material, said gelatinous material being applied in the form of a solution comprising water 40 to 60 per cent., dry gelatin 20 to 25 per cent., sea salt, sugar and glycerin about 15 per cent. in equal parts and pure formaldehyde about 2 per thousand.

3. A process for preserving food stuffs such as carcass, which consists in dividing the meat into pieces and removing the decomposable organs, sterilizing the surface microbes by means of ozone in a vacuum, effecting a slight partial dehydration of the meat in a vacuum at a low pressure, covering the meat thus treated with a material impervious to water and then with a skin of a gelatinous and insoluble material.

In testimony whereof I have affixed my signature in presence of two witnesses.

OLIVIER BOCANDÉ.

Witnesses:
 LOUIS FAUTRAT,
 HANSON C. COXE.